(12) United States Patent
Kazama

(10) Patent No.: US 9,071,777 B2
(45) Date of Patent: Jun. 30, 2015

(54) INFORMATION PROCESSING SYSTEM, INFORMATION PROCESSING METHOD, AND COMPUTER READABLE MEDIUM FOR RECOMMENDING PRINTING MODES FOR ENERGY-SAVINGS

(71) Applicant: FUJI XEROX CO., LTD., Minato-ku, Tokyo (JP)

(72) Inventor: Yuji Kazama, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 45 days.

(21) Appl. No.: 14/279,523

(22) Filed: May 16, 2014

(65) Prior Publication Data
US 2015/0055159 A1    Feb. 26, 2015

(30) Foreign Application Priority Data

Aug. 21, 2013  (JP) ................................ 2013-171398

(51) Int. Cl.
*G06F 15/00*     (2006.01)
*H04N 1/333*    (2006.01)

(52) U.S. Cl.
CPC ................................. *H04N 1/33369* (2013.01)

(58) Field of Classification Search
USPC .................................................. 358/1.1–1.16
See application file for complete search history.

(56) References Cited

U.S. PATENT DOCUMENTS

| | | | |
|---|---|---|---|
| 2006/0168172 A1* | 7/2006 | Kumaran | 709/223 |
| 2007/0003306 A1* | 1/2007 | Jacobsen et al. | 399/79 |
| 2011/0051164 A1 | 3/2011 | Toizumi et al. | |
| 2011/0279858 A1* | 11/2011 | Kano et al. | 358/1.15 |
| 2011/0299106 A1* | 12/2011 | Mori | 358/1.9 |
| 2013/0308147 A1* | 11/2013 | Wu et al. | 358/1.13 |

FOREIGN PATENT DOCUMENTS

| | | | |
|---|---|---|---|
| JP | 4839397 B2 | 12/2011 | |
| JP | 4941463 B2 | 5/2012 | |

* cited by examiner

*Primary Examiner* — Benny Q Tieu
*Assistant Examiner* — Michael Y Tzeng
(74) *Attorney, Agent, or Firm* — Sughrue Mion, PLLC

(57) ABSTRACT

An information processing system includes a determination part, a history storage part, a provisional history storage part, and a changing part. The determination part determines whether or not a printing mode of a job set at a terminal matches a recommended printing mode. The history storage part stores printing histories of plural jobs. The provisional history storage part stores, in a case where the printing mode does not match the recommended printing mode, provisional printing histories including resource-saving effect which represents an effect of reduced resources based on an assumption that the jobs are printed in accordance with the recommended printing mode. The changing part changes the recommended printing mode, based on the stored printing histories and the provisional printing histories.

16 Claims, 15 Drawing Sheets

FIG. 4

| RULE ID | USER | SINGLE/DOUBLE-SIDE | BLACK-AND-WHITE/COLOR | N-UP | TONER-SAVING |
|---|---|---|---|---|---|
| 1 | A | DOUBLE-SIDE | BLACK-AND-WHITE | 2-UP | ON |
| 2 | B | DOUBLE-SIDE | COLOR | 2-UP | ON |
| 3 | C | SINGLE-SIDE | BLACK-AND-WHITE | 1-UP | OFF |
| 4 | D | DOUBLE-SIDE | COLOR | 2-UP | OFF |
| ... | ... | ... | ... | ... | ... |

FIG. 5A

PRINTING FILE NAME: abc.docx
YOUR PRINTING INSTRUCTION DOES NOT CONFORM TO RECOMMENDED PRINTING MODE.
DO YOU AGREE TO CHANGE IT TO RECOMMENDED PRINTING MODE?

| YOUR PRINTING INSTRUCTION | RECOMMENDED PRINTING MODE |
|---|---|
| ○ TONER-SAVING: OFF | ◉ TONER-SAVING: ON |

CHANGE TO RECOMMENDED PRINTING MODE AND PRINT: [CHANGE]
PRINT AS YOUR PRINTING INSTRUCTION: [PRINT] [CANCEL]

FIG. 5B

PRINTING FILE NAME: abc.docx
YOUR PRINTING INSTRUCTION DOES NOT CONFORM TO RECOMMENDED PRINTING MODE.
DO YOU AGREE TO CHANGE IT TO RECOMMENDED PRINTING MODE?

| YOUR PRINTING INSTRUCTION | RECOMMENDED PRINTING MODE |
|---|---|
| ◉ TONER-SAVING: OFF | ○ TONER-SAVING: ON |

CHANGE TO RECOMMENDED PRINTING MODE AND PRINT: [CHANGE]
PRINT AS YOUR PRINTING INSTRUCTION: [PRINT] [CANCEL]
IF YOU DO NOT FOLLOW RECOMMENDED PRINTING MODE, MODIFY CHECK ITEM AND SET REASON-FOR-EXCEPTION.
REASON-FOR-EXCEPTION: [DUE TO BUSINESS OPERATION: DOCUMENT IS FOR CUSTOMERS/CLIENTS ▼]

FIG. 6

| EXCEPTION ID | EXCEPTION CATEGORY | DETAILS |
|---|---|---|
| 1 | DUE TO BUSINESS OPERATION | DOCUMENT IS FOR CUSTOMERS/CLIENTS |
| 2 | DUE TO BUSINESS OPERATION | INSTRUCTION BY BOSS |
| 3 | DUE TO BUSINESS OPERATION | FOLLOW COMPANY REGULATIONS |
| 4 | DUE TO WORK EFFICIENCIES | AVOID POOR VISIBILITY |
| 5 | DUE TO OUTPUT ENVIRONMENT | USE REAR SIDE OF USED PAPER |
| 6 | OTHERS | N/A |

FIG. 7

| JOB ID | COLOR INSTRUCTION | TONER-SAVING INSTRUCTION | DOUBLE-SIDE INSTRUCTION | N-UP INSTRUCTION | EXCEPTION ID SELECTION |
|---|---|---|---|---|---|
| 1 | BLACK-AND-WHITE | ON→OFF | DOUBLE-SIDE | 2-UP | 1 |
| ... | ... | ... | ... | ... | ... |

FIG. 8

| JOB ID | DATE | USER | NUMBER OF OUTPUT SHEETS | TONER USAGE (g) | COLOR MODE |
|---|---|---|---|---|---|
| 1 | 1/1/2012 | A | 10 | 0.003 | BLACK-AND-WHITE |
| ... | ... | ... | ... | ... | ... |

FIG. 9

| JOB ID | DATE | USER | NUMBER OF OUTPUT SHEETS | TONER USAGE (g) | COLOR MODE |
|---|---|---|---|---|---|
| 1 | 1/1/2012 | A | 10 | 0.001 | BLACK-AND-WHITE |
| ... | ... | ... | ... | ... | ... |

FIG. 10A

RECOMMENDED PRINTING RULE

NAME OF RECOMMENDED PRINTING RULE: [SAVING RULE 1]

RECOMMENDED PRINTING MODE: ☑ DOUBLE-SIDE PRINTING ☑ BLACK-AND-WHITE PRINTING ☑ 2-UP PRINTING ☑ TONER-SAVING

CONFIRM WITH USER BEFORE MODIFYING PRINTING RULE: ⦿ YES ○ NO

RECOMMENDED PRINTING RULE

NAME OF RECOMMENDED PRINTING RULE: [SAVING RULE 1]

REASON-FOR-EXCEPTION OF PRINTING RULE CONFORMITY CONDITION:

[$CO_2$ EMISSION BY PRINTING JOB ▼] [100 g] [OR MORE ▼]

RECOMMENDED PRINTING MODE: ☑ DOUBLE-SIDE PRINTING ☑ BLACK-AND-WHITE PRINTING ☑ 2-UP PRINTING ☑ TONER-SAVING

CONFIRM WITH USER BEFORE MODIFYING PRINTING RULE: ⦿ YES ○ NO

| CATEGORY | PRINTING MODE | PRIORITY | ENERGY-SAVING EFFECT PROSPECT | MODIFICATION INSTRUCTION RATE |
|---|---|---|---|---|
| TONER | BLACK-AND-WHITE | 5 | 2 | 3 |
| TONER | TONER-SAVING | 2 | 1 | 1 |
| TONER | ECO FONT | 2 | 1 | 1 |
| PAPER | DOUBLE-SIDE | 5 | 4 | 1 |
| PAPER | N-UP | 2 | 3 | 2 |
| PAPER | SIZE | 2 | 1 | 1 |

FIG. 16

A OF DEVELOPMENT 2 GROUP IS SELECTED AS MODEL USER.
(SELECTED THREE TIMES SO FAR)

DIFFERENCES BETWEEN A AND YOU ARE AS FOLLOWS.
LET'S ACHIEVE FOLLOWING TARGETS AND AIM FOR MODEL USER NEXT TIME.

· CHANGE SINGLE-SIDE PRINTING TO DOUBLE-SIDE PRINTING
  (THREE TIMES IN TOTAL)
· REDUCE PRINTING FREQUENCY ON WEDNESDAYS (ONCE IN TOTAL)
· CHANGE 2-UP PRINTING TO 4-UP PRINTING (THREE TIMES IN TOTAL)

FIG. 17

YOU HAVE BEEN SELECTED AS MODEL USER FOR FIVE PEOPLE INCLUDING B.

YOU HAVE BEEN SELECTED THREE TIMES SO FAR THIS MONTH.

TO FURTHER ENHANCE ENERGY-SAVING EFFECT,
FOLLOWING ACTIONS ARE RECOMMENDED:

· USE ECO-FONT
· USE 4-UP PRINTING INSTEAD OF 2-UP PRINTING

INFORMATION PROCESSING SYSTEM, INFORMATION PROCESSING METHOD, AND COMPUTER READABLE MEDIUM FOR RECOMMENDING PRINTING MODES FOR ENERGY-SAVINGS

CROSS-REFERENCE TO RELATED APPLICATIONS

This application is based on and claims priority under 35 USC 119 from Japanese Patent Application No. 2013-171398 filed Aug. 21, 2013.

BACKGROUND (i) Technical Field

The present invention relates to an information processing system, an information processing method, and a computer readable medium.

(ii) Related Art

In the case where printing is performed using an image forming apparatus, such as a printer or a multifunction device, an information processing apparatus which is connected to the image forming apparatus generates print data for forming an image and issues a printing instruction. On a screen activated by a printer driver installed in the information processing apparatus, a user performs setting for the type of paper, a printing mode, and the like, and a printing instruction is transmitted to the image forming apparatus. The image forming apparatus performs printing in accordance with the contents set by the user.

In recent years, in view of protection of global environment, for printing with an image forming apparatus, there has been increasing demands for resource saving (energy saving) for print media representing printing paper, printing toner, and ink. Some functions of the image forming apparatus are able to promote resource saving by reducing the number of sheets of paper to be used, such as a double-side printing function of printing images on both sides of paper and a collective printing function (so-called N-UP printing) of printing size-reduced plural images on a sheet of paper. Furthermore, there is also available a function of promoting resource saving by reducing the consumption of coloring materials, such as color ink and color toner, by printing a color image as a black-and-white image.

Nowadays, an unspecified number of users connected over a network in offices use image forming apparatuses connected to the network. These image forming apparatuses are managed by a specific administrator. In terms of resource saving, however, since the administrator does not understand business operations of all users, it is very difficult for the administrator to confirm the use status of each user and to promote resource saving.

SUMMARY

According to an aspect of the invention, there is provided an information processing system including a determination part, a history storage part, a provisional history storage part, and a changing part. The determination part determines whether or not a printing mode of a job set at a terminal matches a recommended printing mode. The history storage part stores printing histories of plural jobs. The provisional history storage part stores, in a case where the printing mode does not match the recommended printing mode, provisional printing histories including resource-saving effect which represents an effect of reduced resources based on an assumption that the jobs are printed in accordance with the recommended printing mode. The changing part changes the recommended printing mode, based on the stored printing histories and the provisional printing histories.

BRIEF DESCRIPTION OF THE DRAWINGS

Exemplary embodiments of the present invention will be described in detail based on the following figures, wherein:

FIG. 4 illustrates an example of a recommended printing rule table;

FIGS. 5A and 5B illustrate examples of a printing instruction change screen;

FIG. 6 illustrates an example of a reason-for-exception table;

FIG. 7 illustrates an example of a printing instruction table;

FIG. 8 illustrates an example of a printing history table;

FIG. 9 illustrates an example of a provisional printing history table;

FIGS. 10A and 10B illustrate examples of a recommended printing rule confirmation screen;

FIG. 13 illustrates an example of a printing mode table;

FIG. 16 illustrates an example of a printing action guideline;

FIG. 17 illustrates an example of a printing action guideline;

DETAILED DESCRIPTION

An exemplary embodiment of the present invention will be described below with reference to figures.

Figure 1:
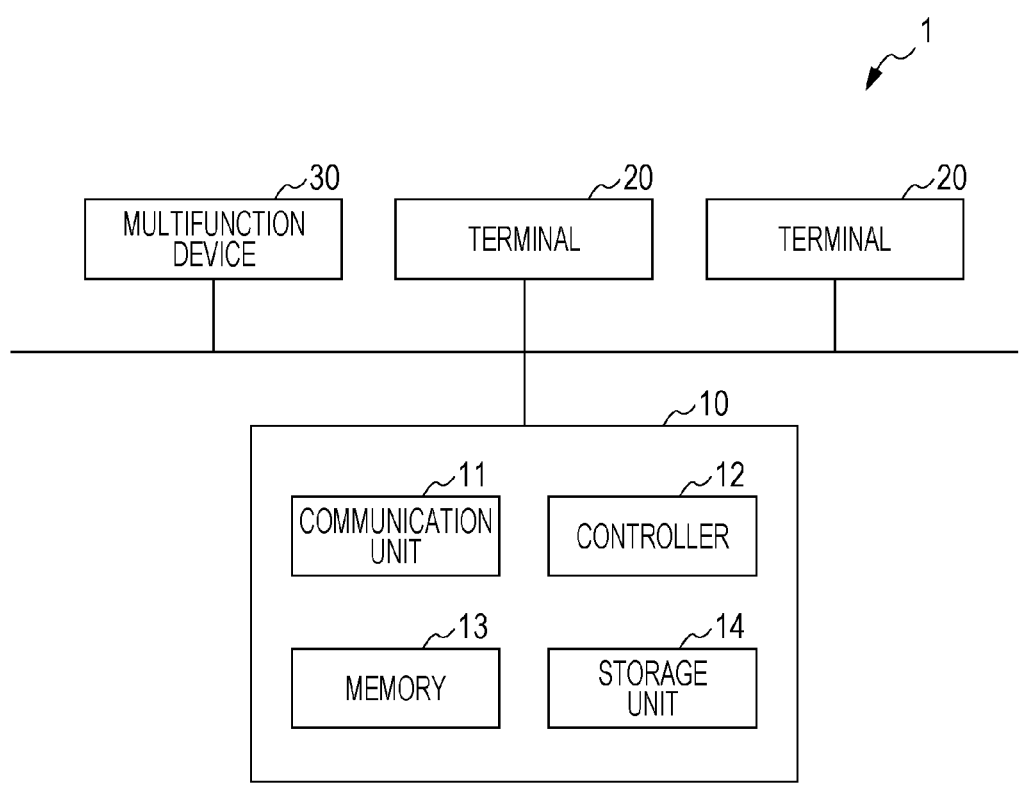
FIG. 1 is a configuration diagram of the entire information processing system according to an exemplary embodiment.

FIG. 1 is a configuration diagram of the entire information processing system 1 according to an exemplary embodiment of the invention. As illustrated in FIG. 1, the information processing system 1 includes an information processing apparatus 10, a terminal 20, and a multifunction device 30. The information processing apparatus 10, the terminal 20, and the multifunction device 30 are connected with one another via a network. The terminal 20 is a personal computer (PC) used by a user, which is provided in singular or plural form. The multifunction device 30 has at least a printing function, and may have a copying function, a scanning function, a facsimile function, and the like. The multifunction device 30 is provided in singular or plural form. FIG. 1 illustrates an example in which two terminals and one multifunction device are provided. The information processing apparatus 10 manages information sent or received to or from the terminal 20 and the multifunction device 30 and controls an operation of the terminal 20 and the multifunction device 30 based on the information. The information processing apparatus 10 is installed, for example, as a management server.

The printing function of the multifunction device 30 provides printing modes including a paper size mode for designating the size of printing paper, a single/double-side mode for designating single-side printing or double-side printing, a collective printing mode (N-UP mode) for designating a collective printing of multiple pages into one page, a black-and-white/color mode for designating black-and-white printing or color printing, a number-of-print-copies mode for designating the number of print copies, and a toner-saving mode for saving toner usage.

The information processing apparatus 10 allows a user to set individual printing modes. Setting of a printing mode may be changed at the multifunction device 30 by a user. For example, after a user issues a printing instruction at the information processing apparatus 10, the user is able to change a printing mode at the multifunction device 30 immediately before operating the multifunction device 30. A recommended printing rule is set for the information processing apparatus 10. The recommended printing rule is a printing rule aiming at a reduction in printing cost and resource saving (hereinafter referred to as "energy saving") which contributes to protection of global environment. In a recommended printing rule, individual printing modes (for example, "single/double-side", "black-and-white/color", "N-UP", and "toner-saving") are set modes for energy saving (for example, "double-side", "black-and-white", "2-UP", and "toner-saving ON"). In a recommended printing rule, for example, the black-and-white/color printing mode is set to the black-and-white printing mode. A recommended printing rule is set for each user. This is because business operations may vary from user to user and required print contents and printing from vary according to the business operations. A printing mode providing energy-saving effect included in a recommended printing rule is called a recommended printing mode.

As illustrated in FIG. 1, the information processing apparatus 10 includes a communication unit 11, a controller 12, a memory 13, and a storage unit 14. Hardware elements configuring the information processing apparatus 10 are connected with each other so that data may be transferred via a bus. The communication unit 11 transmits and receives information to and from the terminal 20 and the multifunction device 30 via a network. The controller 12 controls individual units of the apparatus and performs various types of information processing. The memory 13 stores various programs and data. The storage unit 14 stores a recommended printing rule which includes plural recommended printing modes and plural tables including past printing histories and the like. Details of the storage unit 14 will be described later.

Here, an operation of the information processing system 1 in the case where a user A issues a printing instruction to the multifunction device 30 using the terminal 20 will be described, along with functions of the information processing apparatus 10.

Figure 2:
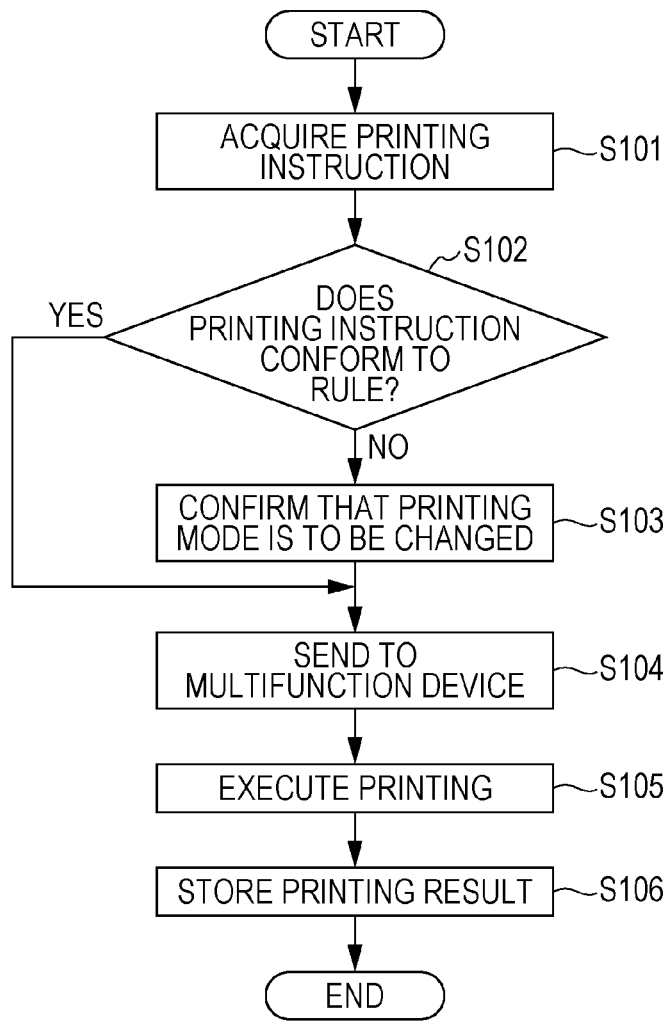
FIG. 2 is a flowchart of an operation of an information processing apparatus according to an exemplary embodiment.
Figure 3:
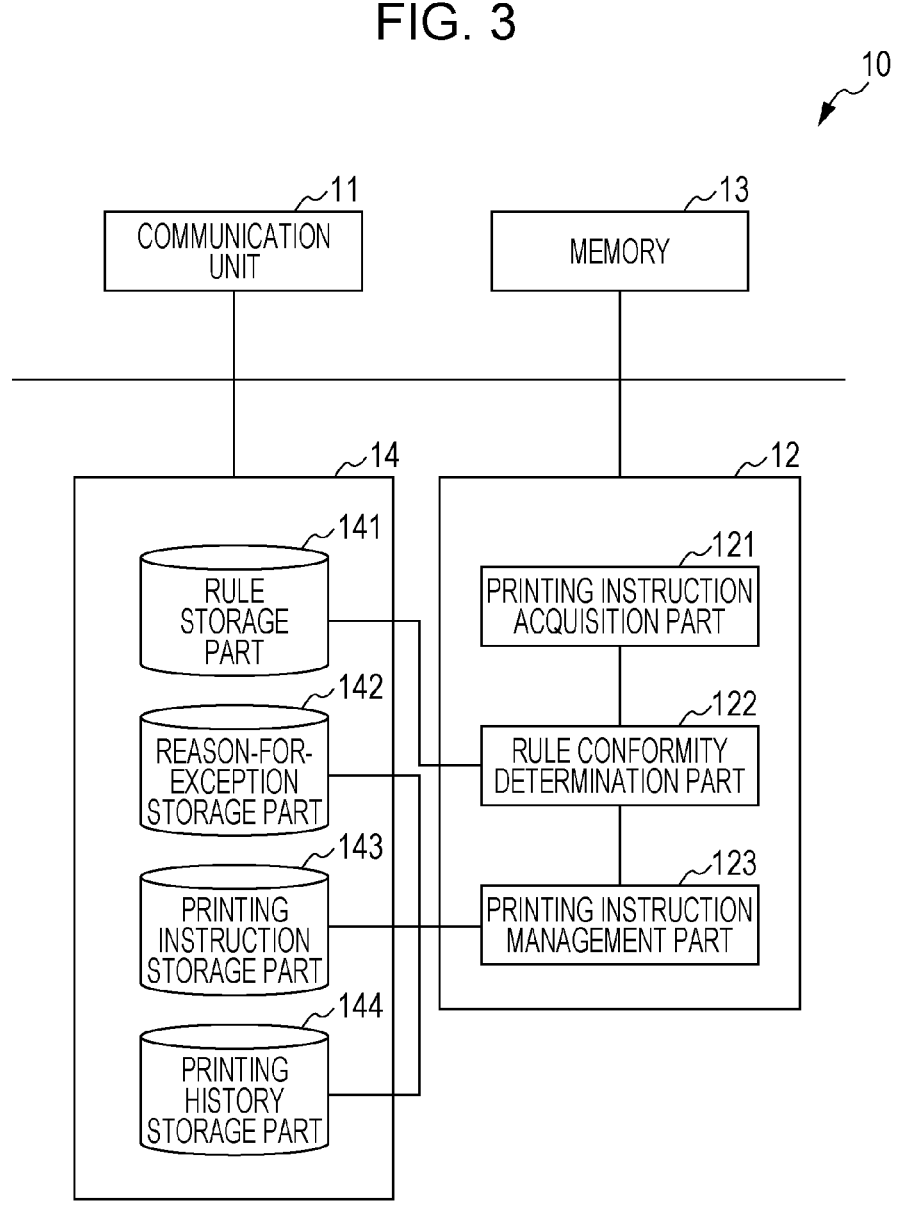
FIG. 3 is a functional block diagram of an information processing apparatus.

FIG. 2 is a flowchart of an operation of the information processing apparatus 10. FIG. 3 is a functional block diagram of the information processing apparatus 10. As illustrated in FIG. 3, the information processing apparatus 10 includes a printing instruction acquisition part 121, a rule conformity determination part 122 (a determination part), and a printing instruction management part 123. The storage unit 14 includes a rule storage part 141, a reason-for-exception storage part 142, a printing instruction storage part 143 (a setting storage part), and a printing history storage part (a history storage part, a provisional history storage part) 144.

When the user A sets desired printing modes and issues a printing instruction using the terminal 20, the printing instruction acquisition part 121 of the information processing apparatus 10 receives the printing instruction (print job) from the terminal 20 (S101). For example, it is assumed that the user A sets "single-side printing", "color printing", "2-UP printing", and "toner-saving: OFF" for individual printing modes and issues an instruction for printing. Information of these printing modes is added to the print job, and the print job is input to the information processing apparatus 10 from the terminal 20.

Then, the rule conformity determination part 122 of the information processing apparatus 10 refers to a recommended printing rule table of the rule storage part 141 and determines whether or not the printing modes of the printing instruction acquired by the printing instruction acquisition part 121 match recommended printing modes for the user A (S102). The recommended printing modes are stored in a table in the rule storage part 141 for each of multiple users. FIG. 4 illustrates an example of a recommended printing rule table. In the recommended printing rule table, a rule ID, a user name, and recommended printing modes for a single/double-side setting, a black-and-white/color setting, an N-UP setting, a toner-saving setting, and the like are registered. For example, as the rule with the ID of 1 (recommended printing rule 1) for the user A, "double-side printing", "black-and-white printing", "2-UP printing", and "toner-saving: ON" are set. A method for setting a recommended printing rule (recommended printing mode) will be described later.

In S102, in the case where the printing modes of the printing instruction by the user A do not match the recommended printing modes, the printing instruction management part 123 of the information processing apparatus 10 causes a display unit of the terminal 20 of the user A to display a printing instruction change screen, and prompts the user A to change a printing mode (S103). In this case, among the printing modes set by the user A, an item of the toner-saving setting does not match the recommended printing mode. Therefore, the printing instruction change screen is displayed on the display unit of the terminal 20 of the user A. The printing instruction management part 123 also functions as a display. FIG. 5A illustrates an example of a printing instruction change screen. On the printing instruction change screen, regarding a printing mode which does not match a recommended printing mode, the contents of the printing mode set by the user A ("toner-saving: OFF") and the contents of the recommended printing mode ("toner-saving: ON") are displayed, and the user is able to select either to change the set contents to the contents of the recommended printing mode or to execute printing in accordance with the printing mode initially set by the user A. As illustrated in FIG. 5B, on the printing instruction change screen, the user may be able to select a reason (reason for exception) for executing printing in accordance with the printing mode initially set, instead of following the recommended printing mode. The contents of reasons for exception are registered in advance in a table of the reason-for-exception storage part 142. FIG. 6 illustrates an example of a reason-for-exception table. A user may enter a reason for exception into a text box.

When the user A changes the printing mode to the recommended printing mode on the printing instruction change screen (see FIGS. 5A and 5B) in S103, that is, when "toner-saving: OFF" is changed to "toner-saving: ON" in this case, the printing instruction management part 123 adds, to the print job issued by the user A, the ID of the user A and information of the printing mode that matches the recommended printing mode, and sends the print job to the multifunction device 30 (S104).

In contrast, when the user A selects the printing mode initially set by the user A on the printing instruction change screen, that is, when "toner-saving: OFF" is not changed in this case, the printing instruction management part 123 adds, to the print job issued by the user A, the ID of the user A and information of the printing mode, and sends the print job to the multifunction device 30 (S104). In this case, the printing instruction management part 123 registers the contents of the printing instruction by the user A different from the recommended printing modes into a table of the printing instruction storage part 143. FIG. 7 illustrates an example of a printing instruction table. Here, the contents of an instruction for replacing "toner-saving: ON" set as a recommended printing mode with "toner-saving: OFF", are registered.

When the multifunction device 30 receives from the printing instruction management part 123 of the information processing apparatus 10 the print job to which the above information has been added, the multifunction device 30 executes printing of the print job in accordance with the printing modes included in the information (S105).

The printing instruction management part 123 stores a printing result in the printing history storage part 144 (S106). FIG. 8 illustrates an example of a printing history table. When the user A does not follow the recommended printing mode and issues an instruction for printing in accordance with the printing mode set initially, the printing instruction management part 123 creates, based on the contents of the print job and the recommended printing mode, a printing result based on the assumption that printing is performed in the recommended printing mode, and stores the created provisional printing result in the printing history storage part 144. FIG. 9 illustrates an example of a provisional printing history table. The provisional printing history table illustrated in FIG. 9 represents a case where printing is performed without following the recommended printing mode, which is, "toner-saving: ON", but is performed with "toner-saving: OFF". In the printing history table of FIG. 8, a toner consumption of 0.003 g is stored as the actual printing processing, while in the provisional printing history table of FIG. 9, a toner consumption of 0.001 g is stored based on the assumption that printing is performed in accordance with the recommended printing mode ("toner-saving: ON") (energy-saving effect which indicates an effect of saving resources based on the assumption that printing is performed in accordance with the recommended printing mode). Here, the toner consumption is given as an example. However, the printing result is not limited to this as long as the printing result indicates information on any consumable resources such as the number of sheets of paper used, carbon dioxide emission, or carbon dioxide reduction.

In S102, when the printing modes of the printing instruction by the user A match the recommended printing modes (see FIG. 4), the process proceeds to S104, and the printing instruction management part 123 adds, to the print job issued by the user A, the ID of the user A and information on the printing mode that follows the recommended printing mode, and sends the print job to the multifunction device 30.

Thus, through the process described above, printing processing of the print job issued by the user A is executed.

The rule conformity determination part 122 may be configured to determine, in step S102, whether or not the printing modes of the printing instruction acquired by the printing instruction acquisition part 121 satisfy conformity conditions of the recommended printing modes for the user A. For example, a printing rule conformity condition may be set to "100 g or more of carbon dioxide emission for a print job", and the rule conformity determination part 122 may determine whether or not the above-mentioned condition is satisfied. In this case, the rule conformity determination part 122 may be configured to prompt the user to change the printing mode to the recommended printing mode when the amount of carbon dioxide emission for printing in accordance with the printing mode issued by the user is "100 g or more". A printing rule conformity condition may be set in the recommended printing rule table in FIG. 4.

Further, the printing instruction management part 123 may cause the terminal 20 to display a screen for confirmation of the recommended printing rule before the terminal 20 displays the printing instruction change screen in S103. FIG. 10A illustrates an example of a recommended printing rule confirmation screen. An item which allows a user to select whether or not the recommended printing rule confirmation screen is to be displayed may be provided. A selecting operation may be performed by an administrator of the information processing system 1 or by a user of the terminal 20. FIG. 10B illustrates an example of a recommended printing rule confirmation screen including a printing rule conformity condition.

In the printing history table in FIG. 8 and the provisional printing history table in FIG. 9, a printing result and a provisional printing result for the user A are illustrated. In each of the tables illustrated in FIG. 8 and FIG. 9, printing results and provisional printing results for multiple users are recorded. In each of the tables in FIGS. 8 and 9, a toner consumption is provided as an example of energy-saving effect. However, other printing modes (for example, "black-and-white printing", "double-side printing", "2-UP printing", and the like) and corresponding energy-saving effects are recorded. Accordingly, by referring to both the tables, multiple users who have similar printing instruction contents (printing status) may be grouped together and the user and the printing mode with the highest degree of contribution to energy-saving effect in the individual groups may be identified (selected).

[Method for Setting Recommended Printing Rule]

The information processing apparatus 10 performs processing of setting and modifying a recommended printing rule (recommended printing mode). An operation of setting and modifying a recommended printing rule will be described below, along with functions of the information processing apparatus 10.

Figure 11:
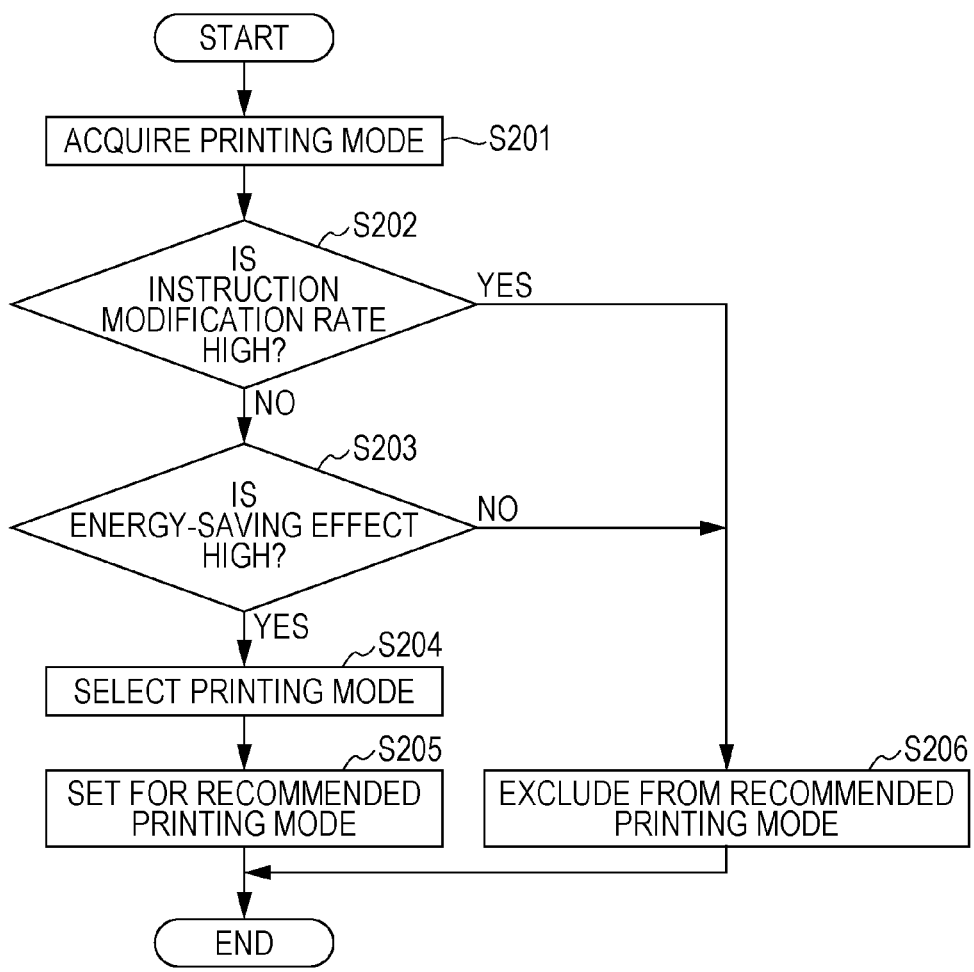
FIG. 11 is a flowchart of an operation of an information processing apparatus.
Figure 12:
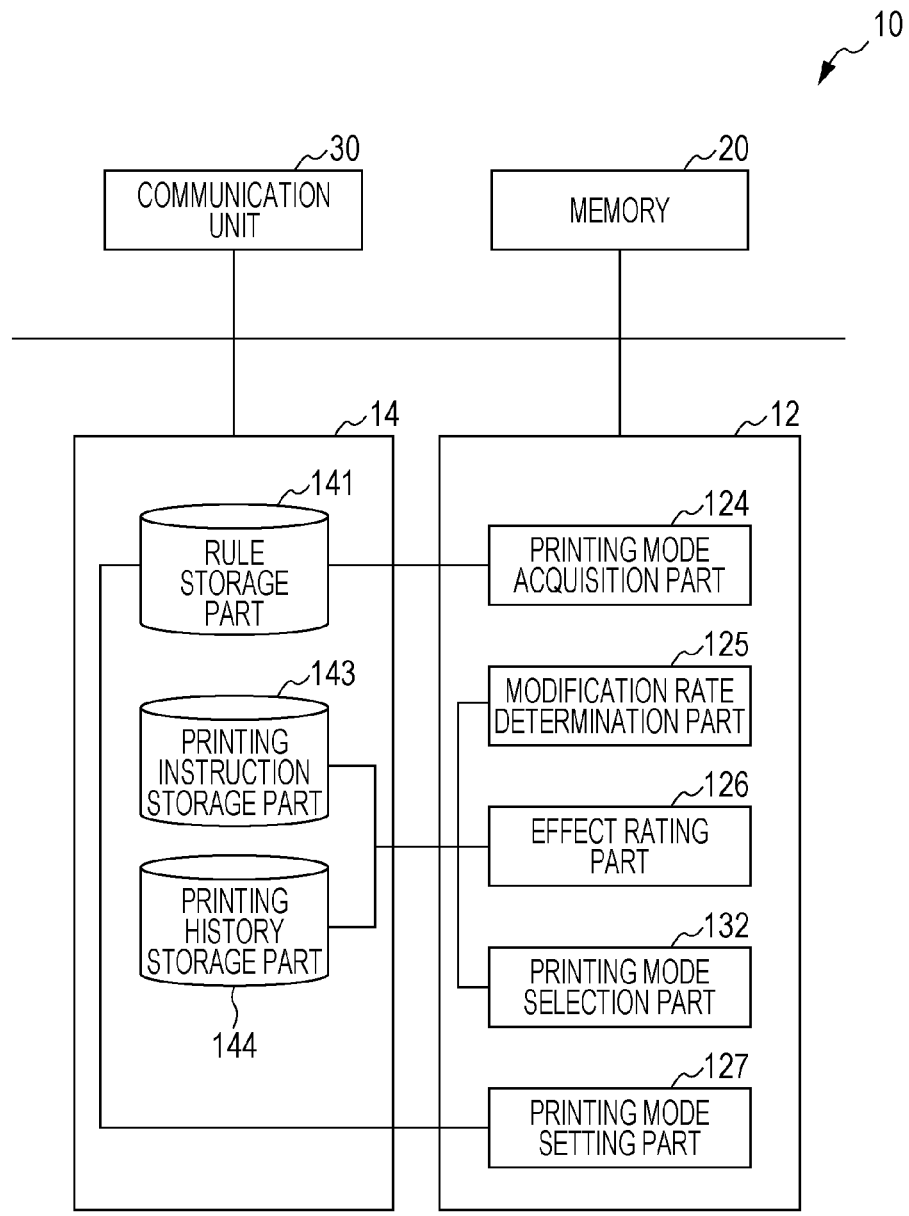
FIG. 12 is a functional block diagram of an information processing apparatus.

FIG. 11 is a flowchart of an operation of the information processing apparatus 10, and FIG. 12 is a functional block diagram of the information processing apparatus 10. As illustrated in FIG. 12, the information processing apparatus 10 further includes, as elements for performing processing of setting and modifying a recommended printing rule, a printing mode acquisition part 124, a modification rate determination part 125, an effect rating part 126, a printing mode selection part 132, and a printing mode setting part 127 (a changing part). In FIG. 12, the elements illustrated in FIG. 3 are omitted in an appropriate manner.

An operation of setting and modifying a recommended printing rule (see FIG. 11) is executed by an administrator for each user at a predetermined timing (cycle). For example, the operation is executed once a month at the beginning of every month.

At the beginning of every month, for example, the printing mode acquisition part 124 of the information processing apparatus 10 refers to the recommended printing rule table of the rule storage part 141 (see FIG. 4), and acquires individual printing modes of the recommended printing rule set for the user A (S201). In this case, the printing mode acquisition part 124 acquires individual printing modes: "double-side printing", "black-and-white printing", "2-UP printing", and "toner-saving: ON".

Then, the modification rate determination part 125 refers to the printing instruction table (see FIG. 7) and the printing history table (see FIG. 8), selects a printing mode with a high "priority" from a printing mode table, and determines whether or not the printing instruction modification rate of the selected printing mode is higher than a predetermined threshold (S202). The printing mode table is created for each user by the printing instruction management part 123 based on the printing instruction table (see FIG. 7), the printing history table (see FIG. 8), and the provisional printing history table (see FIG. 9). For example, the printing instruction management part 123 refers to the printing instruction table in FIG. 7, extracts a changed printing mode (from "toner-saving: ON" to "toner-saving: OFF" in FIG. 7), acquires a provisional energy-saving effect for the extracted printing mode by referring to the provisional printing history table, and creates a printing mode table. If energy saving is achieved by an initially-set printing mode, a resource-saving effect to be achieved when a print job is printed in accordance with the printing mode is registered in the printing mode table. FIG. 13 illustrates an example of a printing mode table. In the printing mode table illustrated in FIG. 13, the priority is determined based on an "energy-saving effect prospect" and a "modification instruction rate". Specifically, the priority is calculated by the following expression:

Priority=(energy-saving effect prospect×α)+(modification instruction rate×β)

In the above expression, α and β each represent weight. The administrator is able to modify weight depending on whether an energy-saving effect or user's convenience is to be prioritized. FIG. 13 illustrates a case where α=β=1, which is a setting value for the case where the energy-saving effect and user's convenience are desired to be well balanced.

In the case where the printing instruction modification rate of the selected printing mode is low, the effect rating part 126 refers to the printing history table (see FIG. 8) and the provisional printing history table (see FIG. 9), and determines whether or not the energy-saving effect of the printing mode is higher than a predetermined threshold (S203).

In the case where the energy-saving effect of the selected printing mode is higher than the predetermined threshold, the printing mode selection part 132 refers to printing history information of a different user (including a provisional resource-saving effect for the case where a print job is provisionally executed in accordance with the recommended printing mode, and a resource-saving effect for the case where a print job is printed in accordance with the actual printing mode) in the printing history table (see FIG. 8) and in the provisional printing history table (see FIG. 9), and selects a printing mode in which the energy-saving effect is higher than the threshold (S204). The printing mode selection part 132 selects, for example, a printing mode of a user, out of multiple users, who has the highest degree of contribution to energy-saving effect. The printing mode setting part 127 sets the selected printing mode as the recommended printing mode (S205). For example, when a printing mode: "double-side printing" (priority: 5) is selected for the user A (first user), the printing mode selection part 132 selects a printing mode: "4-UP", which is a printing mode of a user (second user) with the highest degree of contribution to energy-saving effect, and the printing mode setting part 127 sets the printing mode: "4-UP" as the recommended printing mode for the user A. When the above-mentioned printing mode is not set as the recommended printing mode, the printing mode setting part 127 adds the printing mode to the recommended printing rule table (see FIG. 4). The printing mode selection part 132 may select a printing mode of a user (second user) with the highest degree of contribution to energy-saving effect from among multiple users (group) whose printing instruction contents (printing status) are close to the user A. The printing status includes, for example, various types of information concerning print processing, such as the number of printing sheets, the frequency of printing, and the printing time zone, as well as various types of printing modes. With this configuration, a printing mode which reflects the use status of the user A is set as the recommended printing mode. Further, the printing mode setting part 127 records, in the printing history table in FIG. 8, information representing which printing mode of multiple printing modes has been changed to the recommended printing mode.

In S202, when the printing instruction modification rate of the selected printing mode is higher than the threshold, the printing mode setting part 127 excludes the printing mode from the recommended printing mode (S206). For example, when the user A does not follow "black-and-white printing" set as the recommended printing mode but frequently performs "color printing", it is understood that it is highly required for the user A to perform "color printing". In such a case, taking into account the convenience of the user A, "black-and-white printing" is excluded from the recommended printing mode. Alternatively, "color printing" is set as the recommended printing mode.

In S203, when the energy-saving effect of the selected printing mode is lower than the threshold, the printing mode setting part 127 excludes the printing mode from the recommended printing mode (S206). For example, even if the user A issues a printing instruction in accordance with an "eco-font" printing mode set as the recommended printing mode, in the case where the energy-saving effect of "eco-font" is originally low, there is a little need to set the printing mode as the recommended printing mode. In such a case, taking into account the convenience of the user A, the "eco-font" printing mode is excluded from the recommended printing mode.

Further, when there is no change of the recommended printing mode for a certain period of time, a specific printing mode may be set as a recommended printing mode on the basis of the order of priority.

In the above-described information processing system 1, a recommended printing mode is changed for each user in accordance with the use status of the user. Therefore, when the user is able to afford energy-saving efforts, a more effective energy-saving printing mode may be set as the recommended printing mode. On the other hand, when the user is not able to achieve energy-saving or energy-saving effect is insignificant, a printing mode which is more convenient for the user may be set as the recommended printing mode. There are printing modes of various types and an administrator is not able to understand beforehand which printing mode is effective for saving energy. With the configuration described above, however, setting or changing to a recommended printing mode which achieves a high energy-saving effect without load being imposed onto a user may be automatically performed, thereby energy-saving effect being maintained without imposing load on the administrator or sacrificing user's convenience.

[Method for Setting Model User]

The information processing apparatus 10 performs a processing for setting a model user. A model user is a user who has a high degree of contribution to energy-saving effect. The information processing apparatus 10 sets (selects) a model user. The information processing apparatus also presents to the selected user information indicating that he or she is a model user, and presents a guideline on actions of the model user to other users. A method for setting a model user will be described below, along with functions of the information processing apparatus 10.

Figure 14:
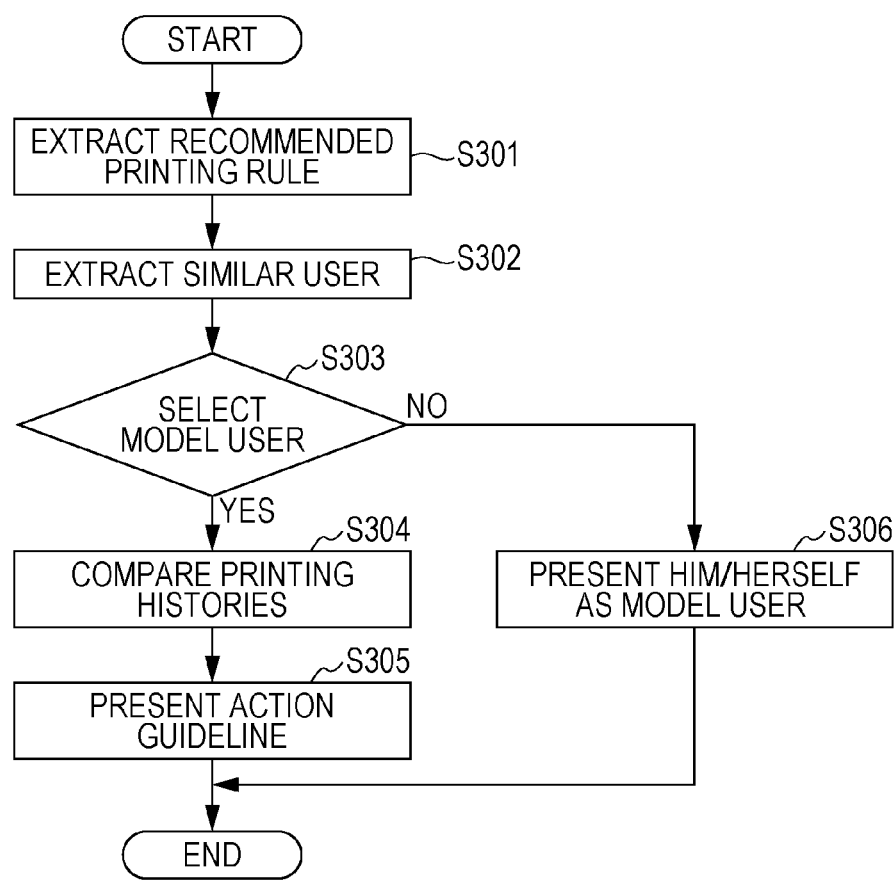
FIG. 14 is a flowchart of an operation of an information processing apparatus.
Figure 15:
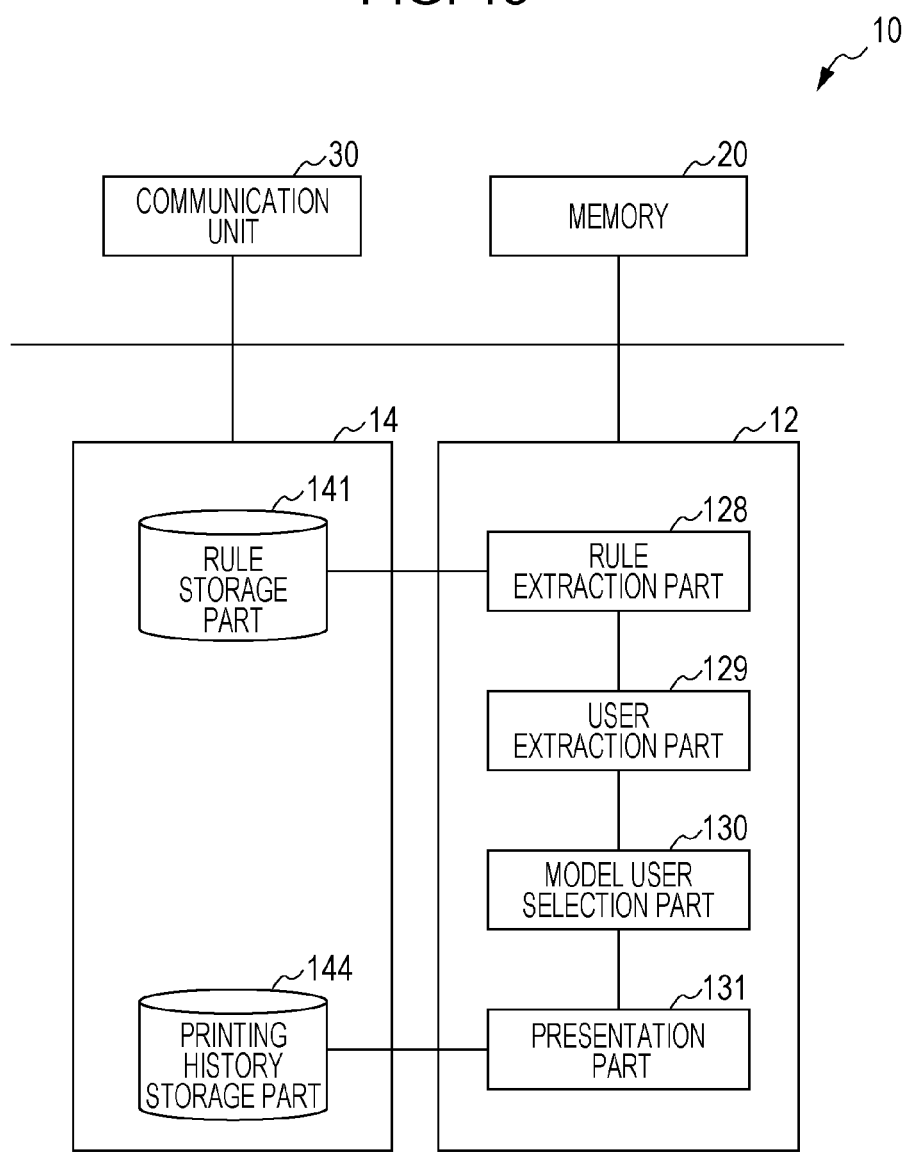
FIG. 15 is a functional block diagram of an information processing apparatus.

FIG. 14 is a flowchart of an operation of the information processing apparatus 10, and FIG. 15 is a functional block diagram of the information processing apparatus 10. As illustrated in FIG. 15, the information processing apparatus 10 further includes, as elements for performing processing of setting a model user, a rule extraction part 128, a user extraction part 129, a model user selection part 130, and a presentation part 131. In FIG. 15, the elements illustrated in FIG. 3 and FIG. 12 are omitted in an appropriate manner.

An operation of setting a model user (see FIG. 14) is executed by an administrator for each user at a predetermined timing (cycle). For example, the operation is executed once a month at the beginning of every month. An operation of setting a model user for a user B will be described below.

At the beginning of every month, for example, the rule extraction part 128 of the information processing apparatus 10 refers to the recommended printing rule table of the rule storage part 141 (see FIG. 4), and extracts a recommended printing rule, out of multiple recommended printing rules, which is similar to the current recommended printing rule set for the user B (S301). In this example, a rule with the ID of 1 and a rule with the ID of 4 are extracted.

Then, the user extraction part 129 extracts a user, out of multiple users, who comes to work for the similar number of days in a certain period of time (S302). For example, a user A and a user C belonging to the same group as the user B are extracted. Alternatively, the user extraction part 129 (grouping part) may group multiple users whose printing instruction contents (printing status) are similar to one another and extract the group.

Next, the model user selection part 130 selects a model user, out of the users extracted in S301 and S302, whose contribution degree to energy-saving effect is high, based on printing past records (printing status) (S303). For example, the model user selection part 130 selects the user A who has the smallest number of output sheets, out of users A, C, and D extracted in S301 and S302, as a model user whose contribution degree to energy-saving effect is high. The model user selection part 130 may, for example, select a model user based on the toner consumption. Alternatively, the model user selection part 130 may select a user, out of a group of multiple users, whose contribution degree of energy-saving effect is the highest.

When the model user is selected, the presentation part 131 refers to the printing history table (see FIG. 8), compares the recent printing histories of the user B with the recent printing histories of the model user (S304), and presents on the terminal 20 of the user B a printing action guideline for approaching the energy-saving effect level of the model user and the effect to be achieved when the action is actually executed (S305). FIG. 16 illustrates a printing action guideline which is presented on the terminal 20 of the user B.

In the case where there is no model user for the user B, the presentation part 131 presents to the user B that the user B is a model user (S306). For example, as illustrated in FIG. 17, the presentation part 131 presents the number of users who regard the user B as a model user, aspects of the user B which are superior to other users, and an action guideline to further enhance energy-saving effect, and the like. The presentation part 131 may present a printing mode, out of the printing modes set by the model user, which is not set by the user B.

With the configuration described above, energy-saving effect of a user is compared with energy-saving effect of a model user whose work style is similar to the user. Therefore, energy-saving may be promoted without spoiling the satisfaction of the user at his or her energy-saving efforts, thereby energy-saving effect being expected. Furthermore, a user is able to recognize objectively that his or her action is effective for energy saving, which helps to raise the consciousness towards continuous energy-saving efforts. Furthermore, even if a specific energy-saving target value is not set in advance, it is possible for a group of users whose work style are similar to inspire one another to enhance energy-saving effect continuously.

Figure 18:
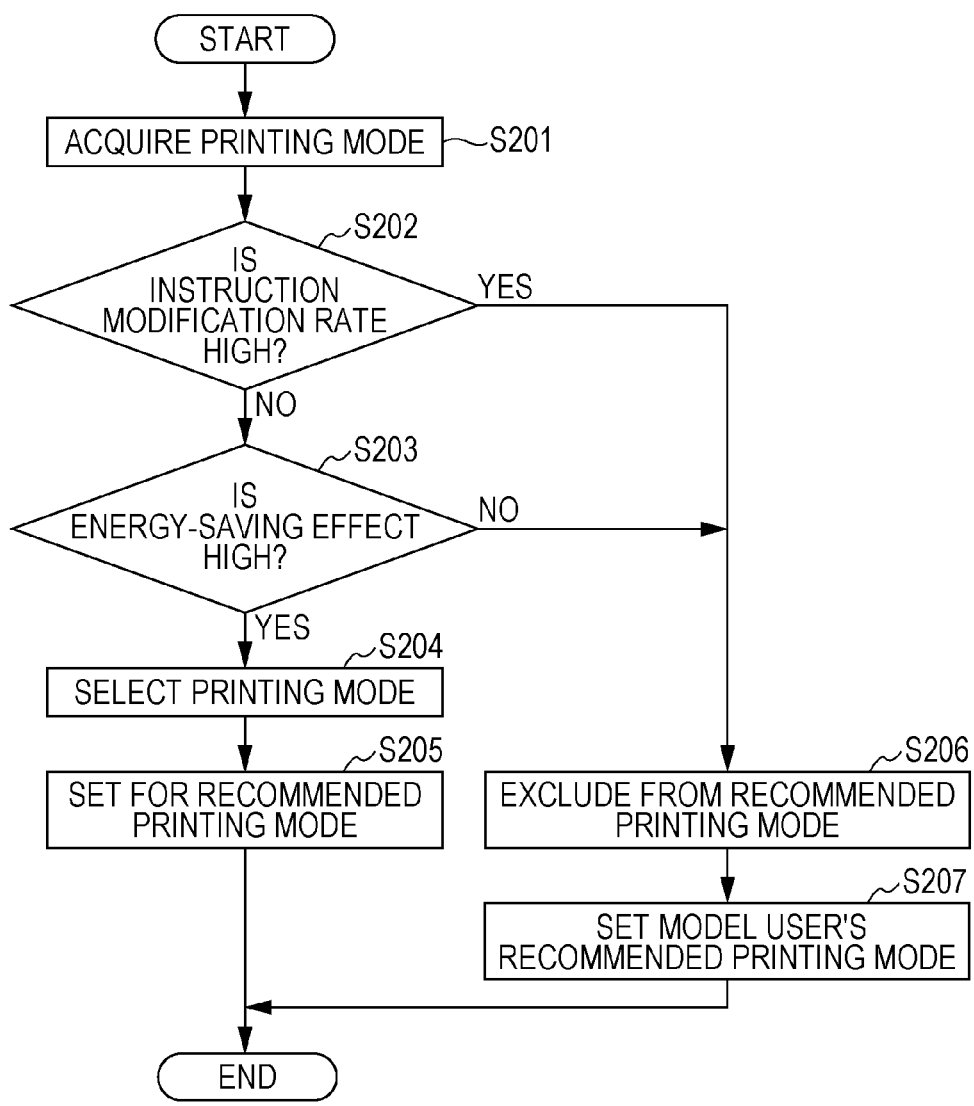
FIG. 18 is a flowchart of an operation of an information processing apparatus.

After the processing of S206 illustrated in FIG. 11, in the case where a recommended printing rule of a model user exists and the adoption of printing modes of the recommended printing rule brings about a high energy-saving effect, the printing modes may be set as the recommended printing modes (see S207 in FIG. 18).

[Reason-for-Exception Aggregation Processing]

The information processing apparatus 10 further performs processing of aggregating reasons (reasons-for-exception) for a user not to follow a recommended printing mode but execute a printing mode initially set.

Figure 19:
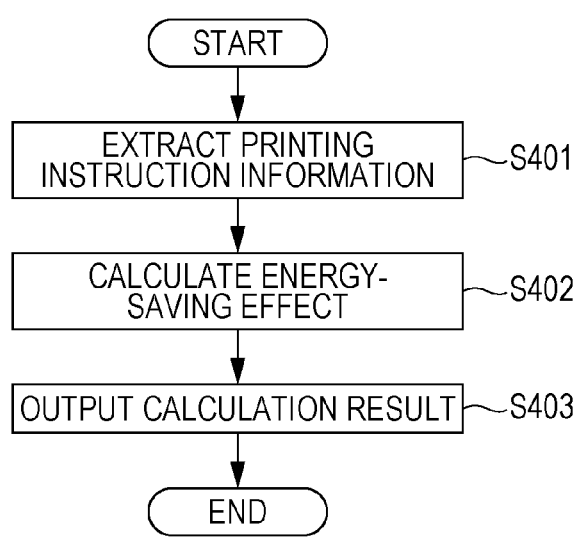
FIG. 19 is a flowchart of an operation of an information processing apparatus.

FIG. 19 is a flowchart of an operation of the information processing apparatus 10. The reason-for-exception aggregation operation is executed by the printing instruction management part 123. The reason-for-exception aggregation operation is executed by an administrator for each user at a predetermined timing. For example, the operation is executed once a month at the beginning of every month.

At the beginning of every month, for example, the printing instruction management part 123 of the information processing apparatus 10 (see FIG. 3) extracts and aggregates printing instruction information in which a reason-for-exception is set, from the printing history storage part 144 which stores printing results and provisional printing results of all users, and from the reason-for-exception storage part 142 which stores the contents of reasons-for-exception (S401).

Next, the printing instruction management part 123 refers to the provisional printing history table of the printing history storage part 144 and calculates, for each reason-for-exception, energy-saving effect to be achieved when the exception is removed (S402).

Then, the printing instruction management part 123 organizes the calculation result into a format of graph or chart, and instructs the multifunction device 30 to output the calculation result, for example, in the report format (S403).

With the configuration described above, an administrator is able to quantitatively assess energy-saving preventive factors, such as company regulations, which may not be addressed by user's efforts, and the possible effect when the factors are removed. Based on such an assessment result, the administrator is able to suggest further energy-saving measures to the executives and the like so that improved energy-saving operation may be achieved.

The present invention is not limited to the above exemplary embodiments. For example, the information processing apparatus 10 may have a configuration for temporarily changing a recommended printing mode. For example, when it seems to be difficult to attain a target by a target date by referring to the degree of achievement of the energy-saving target of the entire office, the information processing apparatus 10 may tighten the criteria of recommended printing modes and set a larger number of printing modes than usual. Further, when it seems to be difficult to attain a target by a target date by referring to the degree of achievement of the energy-saving target of the entire office, the information processing apparatus 10 may increase the frequency of presentation of an action guideline, and take an unusual presentation method, such as sending a notification email not only a screen display or using such an image that draws attention to environmental load. Thus, a situation where an energy-saving target of the entire office is able to be easily attained may be temporarily created at a closing day of aggregation such as the end of a year of the energy-saving effect.

The information processing apparatus 10 may include a configuration for presenting an energy-saving action guideline in accordance with user's preference. For example, a method for presenting an action guideline may be prepared in multiple patterns (an affirmative and encouraging expression towards the current printing action of a user, a negative expression pointing out a problem of the current printing action of a user, and the like). When a printing action of the user is improved after an action guideline is presented, a similar pattern is used again for the next presentation of an action guideline. When a printing action of a user is not improved, the next presentation of an action guideline is performed using a different pattern. Thus, by taking into account user's preference and carrying out effective energy-saving promotion tailored for each user, energy-saving effect may be maintained.

Each of the functions of the individual parts provided in the information processing apparatus 10 is implemented when the controller 2 executes a program stored in the memory 3. This program may be installed into the information processing apparatus 10 from a computer readable information storage medium, such as a compact disc read-only memory (CD-ROM), a digital versatile disc-read only memory (DVD-ROM), or a memory card, or may be downloaded from a communication network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a determination part configured to determine whether or not a printing mode of a job set at a terminal matches a recommended printing mode;
   a history storage part configured to store printing histories of a plurality of jobs;
   a provisional history storage part configured to store, in a case where the printing mode does not match the recommended printing mode, provisional printing histories including resource-saving effect which represents an effect of reduced resources based on an assumption that the jobs are printed in accordance with the recommended printing mode; and
   a changing part configured to change the recommended printing mode, based on the stored printing histories and the provisional printing histories.

2. The information processing system according to claim 1, wherein the changing part is configured to select, based on the printing histories and the provisional printing histories, a printing mode in which a resource-saving effect to be achieved in a case where a job is printed in accordance with the printing mode is higher than a resource-saving effect threshold, and to set the selected printing mode as a new recommended printing mode.

3. The information processing system according to claim 1, wherein the changing part is configured to exclude, from the recommended printing mode for a user, a printing mode in which the resource-saving effect is lower than the resource-saving effect threshold or a printing mode which the user has used less frequently than a frequency threshold.

4. The information processing system according to claim 1, wherein the changing part is configured to perform processing for changing the recommended printing mode at a predetermined cycle, based on a priority calculated based on the resource-saving effect and the frequency of users that do not follow the recommended printing mode.

5. The information processing system according to claim 1, further comprising:
   a user selection part configured to select, by referring to the history storage part, a user who contributes to the resource-saving effect, from among a plurality of users; and
   a presentation part configured to cause the terminal to present setting contents of a printing mode of the selected user.

6. The information processing system according to claim 5, further comprising:
   a grouping part configured to group a plurality of users whose printing statuses are close to one another,
   wherein the user selection part selects, from the group, a user who mostly contributes to the resource-saving effect.

7. The information processing system according to claim 1, further comprising:
   a display configured to cause, in the case where the printing mode does not match the recommended printing mode, the terminal to display a screen for inquiring whether or not contents of the printing mode are allowed to be changed into contents of the recommended printing mode.

8. The information processing system according to claim 7, wherein the display is configured to cause the terminal to further display a screen for inquiring a reason for not following the recommended printing mode.

9. The information processing system according to claim 1, wherein, in a case where the printing mode matches the recommended printing mode, the job is sent to a multifunction device.

10. The information processing system according to claim 9, wherein, in the case where the printing mode does not match the recommended printing mode, the information processing system prompts the user to change the printing mode to the recommended printing mode.

11. The information processing system according to claim 1, wherein the information processing system is configured to set an energy savings target, and the determination part is configured to determine whether an actual energy usage will exceed the energy savings target,
   in a case where the determination part determines that the actual energy usage will exceed the energy savings target, the information processing system increases a frequency at which users are prompted to change the printing mode to the recommended printing mode.

12. The information processing system according to claim 1, further comprising an acquiring part configured to acquire a printing instruction from a terminal, wherein the determination part is configured to determine whether or not a printing mode of the acquired printing instruction set by a user of the terminal matches a first recommended printing mode, which has been set for the user.

13. The information processing system according to claim 12, wherein the changing part is configured to change the first recommend printing mode into a second recommended printing mode, based on the stored printing histories and the provisional printing histories.

14. An information processing system comprising:
a terminal configured to be used by a user;
a device configured to have a printing function; and
an information processing apparatus configured to connect to the terminal and the device via a network,
wherein the information processing apparatus includes:
  a determination part configured to determine whether or not a printing mode of a job set by the user at the terminal matches a recommended printing mode;
  a history storage part configured to store printing histories of a plurality of jobs;
  a provisional history storage part configured to store, in a case where the printing mode does not match the recommended printing mode, provisional printing histories including resource-saving effect which represents an effect of reduced resources based on an assumption that printing is performed in accordance with the recommended printing mode; and
  a changing part configured to change the recommended printing mode, based on the stored printing histories and the provisional printing histories, and
wherein the device is configured to receive, from the information processing apparatus, a job to which information of the printing mode has been added, and to execute printing of the received job.

15. An information processing method comprising:
determining whether or not a printing mode of a job set at a terminal matches a recommended printing mode;
storing printing histories of a plurality of jobs;
storing, in a case where the printing mode does not match the recommended printing mode, provisional printing histories including resource-saving effect which represents an effect of reduced resources based on an assumption that the jobs are printed in accordance with the recommended printing mode; and
changing the recommended printing mode, based on the stored printing histories and the provisional printing histories.

16. A non-transitory computer readable medium storing a program causing a computer to execute a process for information processing, the process comprising:
determining whether or not a printing mode of a job set at a terminal matches a recommended printing mode;
storing printing histories of a plurality of jobs;
storing, in a case where the printing mode does not match the recommended printing mode, provisional printing histories including resource-saving effect which represents an effect of reduced resources based on an assumption that the jobs are printed in accordance with the recommended printing mode; and
changing the recommended printing mode, based on the stored printing histories and the provisional printing histories.

* * * * *